United States Patent Office 3,423,487
Patented Jan. 21, 1969

3,423,487
THIOPHOSPHORIC ACID ESTERS
Guenter Scheuerer, Adolf Zeidler, and Heiner Dickhaeuser, Ludwigshafen (Rhine), and Heinrich Adolphi, Limburgerhof, Pfalz, Germany, assignors to Badische Anilin- & Soda-Fabrik Aktiengesellschaft, Ludwigshafen (Rhine), Rhineland, Pfalz, Germany
No Drawing. Filed Mar. 29, 1966, Ser. No. 538,215
Claims priority, application Germany, Apr. 9, 1965, B 81,369
U.S. Cl. 260—946   10 Claims
Int. Cl. C07f 9/18; A01n 9/36

The present invention relates to new phosphoric esters, particularly phosphoric esters containing a corboxyl radical. The invention also relates to methods for controlling flies, gnats or their larvae without injury to useful insects.

It is an object of the invention to provide new thiophosphoric esters. Another object of the invention is to provide thiophosporic esters containing a carboxyl radical. These thiophosphoric esters have an excellent action against insect pests. A further object of the invention is a process for controlling insects, particularly for controlling flies, gnats or their larvae with thiophosphoric esters, useful insects not being injured.

The use of phosphoric ester contact insecticides for control of pests is already known. The active substances hitherto used are distinguished by the considerable scope of their action, affecting more or less all species of insects. Thus each controlling action causes a considerable disturbance of the biocoenosis and injures or destroys the useful insects as well, for example rove beetles and the like.

We have found that compounds having the general formula $$\begin{array}{c} R^1O \\ \phantom{R^1O}\diagdown \phantom{R}S \\ \phantom{R^1O}\phantom{\diagdown}P{\diagup\!\!\!\diagdown} \\ R^2O \phantom{\diagdown} OR^3 \end{array}$$

in which $R^1$ is an alkyl radical having one to three carbon atoms, $R^2$ is an alkyl radical having one to three carbon atoms and $R^3$ is 4-acetylnaphthyl-(1) or a radical having the formula $$-\!\!\!\left\langle\!\!\!\bigcirc\!\!\!\right\rangle\!\!\!-\overset{\overset{\displaystyle O}{\|}}{C}\!\!-\!R^4$$
$$(X)_n$$

in which $R^4$ denotes a methyl group or an ethyl group, X denotes a methyl group or halogen atom, especially a chlorine atom or a bromine atom, and $n$ denotes zero or one of the integers 1 and 2, have good insecticidal action.

The compounds to be used according to the invention may be prepared by conventional methods, for example by reaction of a O,O-dialkylthionophosphoryl halide having the formula $$\begin{array}{c} R^1O \\ \phantom{R^1O}\diagdown \phantom{R}S \\ \phantom{R^1O}\phantom{\diagdown}P{\diagup\!\!\!\diagdown} \\ R^2O \phantom{\diagdown} Hal \end{array}$$

with an appropriate acylphenol having the formula $$HO-\!\!\!\left\langle\!\!\!\bigcirc\!\!\!\right\rangle\!\!\!-CO-R^4$$
$$(X)_n$$

or with 4-acetyl-α-naphthol ($R^1$, $R^2$, $R^3$, $R^4$, X and $n$ having the meanings given above and Hal denoting chlorine or bromine) in the presence of an agent which will bind hydrogen halide, or direct with a salt of an acylphenol.

Suitable O,O-dialkylthionophosphoryl halides are: O,O-dimethylthionophosphoryl chloride or bromide, O,O-diethylthionophosphoryl chloride or bromide, O,O-dipropylthionophosphoryl chloride or bromide, or O,O-diisopropylthionophosphoryl chloride or bromide.

Examples of acylphenols are: 4-hydroxyacetophenone, 4-hydroxypropiophenone, 2 - methyl-4-hydroxyacetophenone, 3-methyl-4-hydroxyacetophenone, 2,3 - dimethyl-4-hydroxyacetophenone, 2,5 - dimethyl-4-hydroxyacetophenone, 3-chloro-4-hydroxyacetophenone, 3 - chloro-4-hydroxyacetophenone, 3 - chloro-4-hydroxypropiophenone, 2,5-dichloro-4-hydroxyacetophenone, 3-chloro-5-methyl-4-hydroxyacetophenone, 3-bromo-4-hydroxyacetophenone, 3,5-dibromo-4-hydroxyacetophenone and 4-acetyl-α-naphthol.

Compounds to be used according to the invention may be prepared for example as follows:

18.0 parts (parts by weight) of O,O-dimethylthionophosphoryl chloride dissovlev in 20 parts of acetone is added to a suspension of 15.8 parts of the sodium salt of 4-hydroxyacetophenone in 50 parts of acetone and when the exothermic reaction has subsided the while is boiled for two hours under reflux, and then cooled. The deposited sodium chloride is separated from the solution and the acetone is substantially distilled off from the filtrate. The residue is taken up in 100 parts of chloroform, washed with sodium carbonate solution and water, and dried over sodium sulfate. The solvent is removed in vacuo. 23.0 parts of a brownish oil remains; $n_D^{25}=1.544$. The substance has the formula:

(1) $CH_3O\!\!-\!\!P(=\!S)(OCH_3)\!-\!O\!-\!C_6H_4\!-\!C(=\!O)\!-\!CH_3$

The following may be prepared in an analogous manner:

(2) $C_2H_5O\!\!-\!\!P(=\!S)(OC_2H_5)\!-\!O\!-\!C_6H_4\!-\!C(=\!O)\!-\!CH_3$ pale brown oil
$n_D^{25}=1.527$ (3) $CH_3O\!\!-\!\!P(=\!S)(OCH_3)\!-\!O\!-\!C_6H_3(CH_3)\!-\!C(=\!O)\!-\!CH_3$ reddish oil
$n_D^{25}=1.544$ (4) $C_2H_5O\!\!-\!\!P(=\!S)(OC_2H_5)\!-\!O\!-\!C_6H_3(CH_3)\!-\!C(=\!O)\!-\!CH_3$ orange oil
$n_D^{25}=1.525$ (5) $CH_3O\!\!-\!\!P(=\!S)(OCH_3)\!-\!O\!-\!C_6H_3(Cl)\!-\!C(=\!O)\!-\!CH_3$ pale brown oil
$n_D^{25}=1.555$ (6) $C_2H_5O\!\!-\!\!P(=\!S)(OC_2H_5)\!-\!O\!-\!C_6H_3(Cl)\!-\!C(=\!O)\!-\!CH_3$ orange oil
$n_D^{25}=1.534$

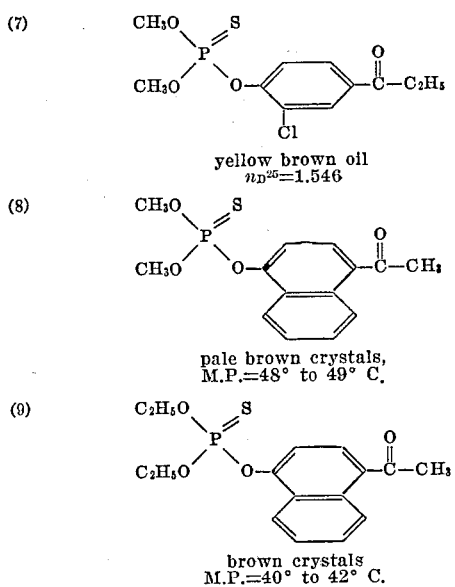

(7) yellow brown oil $n_D^{25}=1.546$ (8) pale brown crystals, M.P.=48° to 49° C.

(9) brown crystals M.P.=40° to 42° C.

The active substances obtained in oily or solid form may be processed in a conventional way by adding extenders, solvents, emulsifiers or other assistants to form suspensions, solutions, emulsifiable concentrates, spreading powders or dusting powders, and used in these forms. They may also be mixed with other plant protection agents, for example insecticides.

The insecticides to be used according to this invention are distinguished by a strong action against Diptera, for example flies, gnats and their larvae, but are inactive against useful insects, for example ladybirds or assassin bugs.

The invention is illustrated by the following examples in which the following commercial products are used for purposes of comparison:

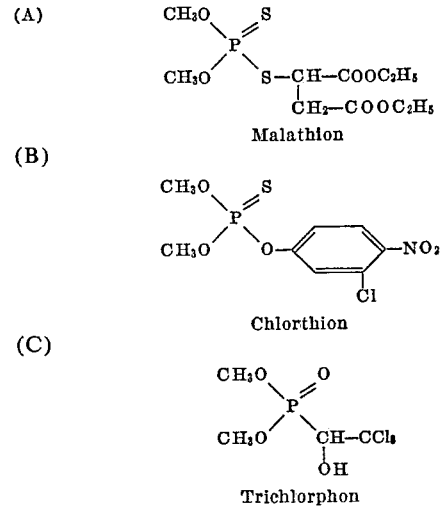

(A) Malathion (B) Chlorthion (C) Trichlorphon

EXAMPLE 1

Application test with houseflies

Houseflies (*Musca domestica L.*) which are four days old receive in light carbon dioxide narcosis 1 mm.³ of the acetone solution of the active substance applied to the ventral abdomen. Four hours later the mortality is determined and from this the $LD_{50}$ of each fly in gamma units. The results are as follows—

| Active substance: | Gamma rating |
|---|---|
| 2 | 0.3 |
| 3 | 0.4 |
| 4 | 0.2 |
| 9 | 0.3 |
| A | 0.6 |
| C | 4.0 |

EXAMPLE 2

Contact test with vinegar flies

The wall of a 250 ccm. beaker is wetted with 1 ccm. of an acetone solution of the active substance to be tested. After the solvent has evaporated, vinegar flies (*Drosophila melanogaster*) are introduced into the beaker and the mortality rate is determined six hours later. The $LD_{50}$ in gamma units per beaker is then determined. The results are as follows—

| Active substance: | Gamma rating |
|---|---|
| 1 | 0.45 |
| 3 | 1.2 |
| 5 | 0.8 |
| 6 | 1.2 |
| B | 16 |
| C | 10.6 |

EXAMPLE 3

Breeding test with vinegar flies

The active substance is added to 40 g. of an Indian corn groats/agar nutrient medium which is well coated with eggs of *Drosophila melanogaster* and the eggs are incubated at 24° C. Twelve days later, the effect is determined (i.e., the amount of active substance, at which development is inhibited, is determined). The results are as follows—

| Active substance: | Amount in mg. |
|---|---|
| 1 | 0.025 |
| 2 | 0.025 |
| 3 | 0.025 |
| 4 | 0.05 |
| 5 | 0.02 |
| 6 | 0.01 |
| 7 | 0.05 |
| 8 | 0.05 |
| A | 0.1 |
| B | 0.2 |
| C | 0.25 |

On the other hand, the new compounds are practically inactive against other groups of insects or mites, as can be seen from the following table:

| Active substance No. | Orthoptera Blatta orientalis | Coleoptera Sitophilus granaria | Lepidoptera Plutella maculipennis | Rynchota Aphis fabae | Acaridae Tetranychus bimaculatus |
|---|---|---|---|---|---|
| 1 | 2.5 mg. inactive | 1 mg. inactive | 0.1% inactive | 0.1% inactive | 0.1% inactive |
| 2 | 10 mg. inactive | do | do | do | Do. |
| 3 | 2.5 mg. inactive | do | do | do | Do. |
| 4 | 5 mg. inactive | do | do | do | Do. |
| 5 | 2.5 mg. inactive | do | do | do | Do. |
| 6 | 5 mg. inactive | do | do | do | Do. |
| 7 | 2.5 mg. inactive | do | do | do | Do. |
| 8 | 10 mg. inactive | do | do | do | Do. |
| 9 | do | do | do | do | Do. |
| A | 0.5 mg. effective | 0.4 mg. effective | 0.025% effective | 0.02% effective | 0.01% effective. |
| B | 0.25 mg. effective | 0.15 mg. effective | | 0.01% effective | 0.05% effective. |
| C | do | | 0.01% effective | | Do. |

The values given in the table are determined by the following tests:

(a) Continuous contact on cockroaches.—Adult Oriental cockroaches (*Blatta orientalis* L.) are placed on a filter with 500 mg. of a dust which contains the test substance and the effect after forty-eight hours is observed. The amount of substance in mg. is given which destroys more than 80% of the test insects.

(b) Continuous contact on granary weevils.—The inner surface of a Petri dish having a diameter of 10 cm. is wetted uniformly with 1 ccm. of an acetone solution of the active substance to be tested. After the solvent has evaporated, granary weevils (*Sitophilus granarius* L.) are introduced into the dish and the effect is determined after four hours. The effective amount, given in mg. of active substance per dish, is that which achieves a mortality rate of more than 80%.

(c) Stomach poison effect on caterpillars.—Cabbage leaves are dipped in an aqueous preparation of the active substance and coated with caterpillars of the cabbage moth (*Plutella maculipennis*). Forty-eight hours later the effect is determined. The concentration of active substance in the preparation at which the mortality rate is more than 80% is given.

(d) Spray test against plant lice.—Potted bean plants, which exhibit strong attack by bean aphid (*Aphis fabae*) are sprayed until dripping wet with an aqueous preparation of the active substance. The effect is determined twenty-four hours later, the concentration being given at which mortality is more than 80%.

(e) Spider mite test.—Potted dwarf beans which exhibit a strong attack by two-spotted spider mites (*Tetranychus bimaculatus*) and an abundant deposit of eggs, are sprayed with an aqueous preparation of the active substance until they are dripping wet. The concentration is regarded as effective which kills more than 95% of all mites and with which no viable fresh larvae have emerged from the eggs after twelve days.

What we claim:

1. A compound having the formula

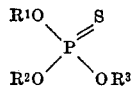

in which $R^1$ denotes an alkyl radical having one to three carbon atoms, $R^2$ denotes an alkyl radical having one to three carbon atoms and $R^3$ denotes a member selected from the group consisting of the radical

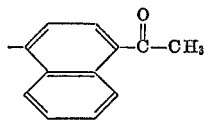

and the radical having the formula

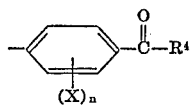

in which $R^4$ denotes a member selected from the group consisting of methyl and ethyl, X denotes a member selected from the group consisting of methyl chlorine and bromine, and $n$ denotes a member selected from the group consisting of zero, 1 and 2.

2. A compound of the formula

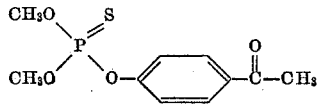

3. A compound of the formula

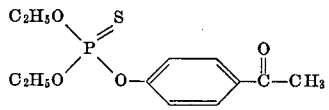

4. A compound of the formula

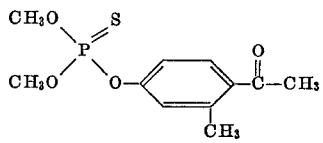

5. A compound of the formula

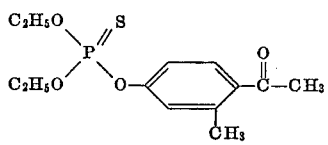

6. A compound of the formula

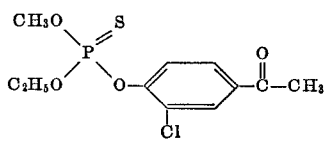

7. A compound of the formula

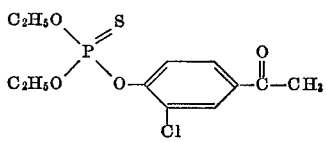

8. A compound of the formula

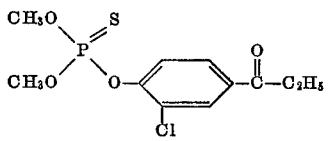

9. A compound of the formula

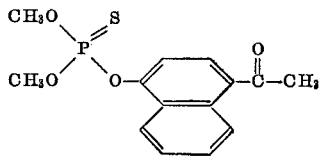

10. A compound of the formula

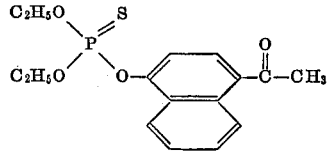

References Cited

FOREIGN PATENTS 946,440  5/1950  France.

CHARLES B. PARKER, *Primary Examiner.*

R. L. RAYMOND, *Assistant Examiner.*

U.S. Cl. X.R.

424—214